(12) United States Patent
Williams et al.

(10) Patent No.: US 6,872,937 B2
(45) Date of Patent: Mar. 29, 2005

(54) WELL LOGGING APPARATUS WITH GADOLINIUM OPTICAL INTERFACE

(75) Inventors: James Richard Williams, University Heights, OH (US); Brian Marshall Palmer, Stow, OH (US); Jeff Johanning, Hudson, OH (US)

(73) Assignee: General Electric Company, Schenectady, NY (US)

( * ) Notice: Subject to any disclaimer, the term of this patent is extended or adjusted under 35 U.S.C. 154(b) by 202 days.

(21) Appl. No.: 10/248,154

(22) Filed: Dec. 20, 2002

(65) Prior Publication Data
US 2004/0119008 A1 Jun. 24, 2004

(51) Int. Cl.$^7$ ................................................ G01V 5/04
(52) U.S. Cl. ........................................................ 250/256
(58) Field of Search .......................................... 250/256

(56) References Cited

U.S. PATENT DOCUMENTS

| | | | |
|---|---|---|---|
| 4,454,424 A | * | 6/1984 | Strauss et al. .............. 250/368 |
| 4,590,370 A | | 5/1986 | Mills, Jr. et al. |
| 4,849,036 A | * | 7/1989 | Powell et al. .................. 156/99 |
| 5,796,109 A | * | 8/1998 | Frederick et al. ........... 250/368 |
| 5,892,460 A | | 4/1999 | Jerabek et al. |
| 6,075,611 A | | 6/2000 | Dussan V. et al. |
| 6,137,621 A | | 10/2000 | Wu |
| 6,419,013 B1 | | 7/2002 | Milne et al. |
| 6,437,336 B1 | | 8/2002 | Pauwels et al. |
| 6,445,187 B1 | | 9/2002 | Montgomery et al. |
| 6,738,720 B2 | * | 5/2004 | Odom et al. ................... 702/78 |

FOREIGN PATENT DOCUMENTS

| | | | | |
|---|---|---|---|---|
| EP | 231693 A1 | 8/1987 | | |
| EP | 1403661 A1 | 3/2004 | | |
| JP | 57-149846 A | * | 9/1982 | ............. C03C/3/18 |
| JP | 9-208255 A | * | 8/1997 | ............. C03C/4/08 |

* cited by examiner

*Primary Examiner*—Constantine Hannaher
(74) *Attorney, Agent, or Firm*—Armstrong Teasdale LLP

(57) ABSTRACT

A well logging apparatus includes a probe having a detector assembly. In an exemplary embodiment, the detector assembly includes a scintillator having scintillation a crystal capable of producing light when exposed to gamma rays, a photo-multiplier, and an optical interface positioned between the scintillator and the photo-multiplier. The optical interface optically couples the scintillator and the photo-multiplier. The optical interface includes a gadolinium doped filter glass.

23 Claims, 3 Drawing Sheets

WELL LOGGING APPARATUS WITH GADOLINIUM OPTICAL INTERFACE

BACKGROUND OF INVENTION

This invention relates generally to well logging apparatus, and more particularly to well logging apparatus that include a gadolinium optical interface.

Modern petroleum drilling operations require large quantities of information relating to geological formations and conditions through which the drill is passing. This collection of information is commonly referred to as logging and can be performed by a number of methods. Oil well logging has been known for many years as a technique for providing information to a driller regarding the particular earth formations being drilled. In conventional wireline logging, a probe or sonde housing information sensors is lowered into a bore hole after some or all of the well has been drilled, and is used to determine certain characteristics of the formations traversed by the bore hole. The sonde is supported by a conductive wireline, which attaches to the sonde at the upper end. Power is transmitted to the sensors through the conductive wireline. Also, the instrumentation in the sonde communicates information to the surface by electrical signals transmitted through the wireline.

One known method of oil well logging includes a fast neutron source in the logging tool. Neutrons from this source are scattered and absorbed in the well bore environment producing gamma rays. These gamma rays are detected by NaI scintillation crystals in the tool and give information on physical traits of the well bore environment. Light produced from scintillations in NaI is transmitted through an optical interface to a photo-multiplier tube. Despite shielding the surfaces of the NaI scintillator that do not couple to the photo-multiplier tube, neutrons can enter through the optical interface. Thermalized neutrons activate the iodine in the NaI scintillation crystals, which then decays with a half life of 25 minutes. As these decays occur, the NaI scintillator detects the radiation emitted and an elevated background count is created. This background count disturbs and skews the measurements of interest.

One known approach to exclude neutrons from the optical end of the NaI scintillator is to wrap the entire photo-multiplier tube in cadmium. This approach has several disadvantages. Cadmium has only moderate capability at absorbing thermal neutrons. Therefore, the detector must be reduced in length to provide space for the amount of cadmium needed to effectively shield neutrons. Also, cadmium is a known carcinogen and is toxic. The cadmium wrapping is external to the detector thereby limiting the space available for the sensor in the logging tool.

SUMMARY OF INVENTION

In one aspect, a well logging apparatus is provided that includes a probe having a detector assembly. The detector assembly includes a scintillator having a scintillation crystal capable of producing light when exposed to gamma rays, a photo-multiplier, and an optical interface positioned between the scintillator and the photo-multiplier. The optical interface optically couples the scintillator and the photo-multiplier. The optical interface includes a gadolinium doped filter glass.

In another aspect, a detector assembly for a well logging tool is provided. The detector assembly includes a scintillator having a scintillation crystal capable of producing light when exposed to gamma rays, a photo-multiplier, and an optical interface positioned between the scintillator and the photo-multiplier. The optical interface optically couples the scintillator and the photo-multiplier. The optical interface includes a gadolinium doped filter glass.

In another aspect, a well logging apparatus is provided. The well logging apparatus includes a probe housing and a detector assembly positioned in the probe housing. The detector assembly includes a scintillator having a scintillation crystal capable of producing light when exposed to gamma rays, a photo-multiplier, and an optical interface positioned between the scintillator and the photo-multiplier. The optical interface optically couples the scintillator and the photo-multiplier. The optical interface includes a gadolinium doped filter glass.

DETAILED DESCRIPTION

A detector assembly for a well logging probe is described in detail below. The logging probe includes a fast neutron source that produce neutrons that are scattered and absorbed in the well bore environment producing gamma rays. The detector assembly includes an optical interface positioned between and optically coupling a scintillator and a photo-multiplier tube. The scintillator includes a scintillation crystal, for example a NaI scintillation crystal, that produce light when exposed to gamma rays. The optical interface includes a gadolinium (Gd) doped filter glass which prevents neutrons from entering the detector through the optical interface and activating the iodine in the NaI crystal, which then decays. Any iodine decay emits radiation which is detected by the scintillator and produces a elevated background count. This elevated background can skew the measurements of gamma rays by the detector. The elimination of neutron activation of iodine by the Gd doped filter glass facilitated the production of accurate measurements by the well logging probe.

Figure 1:
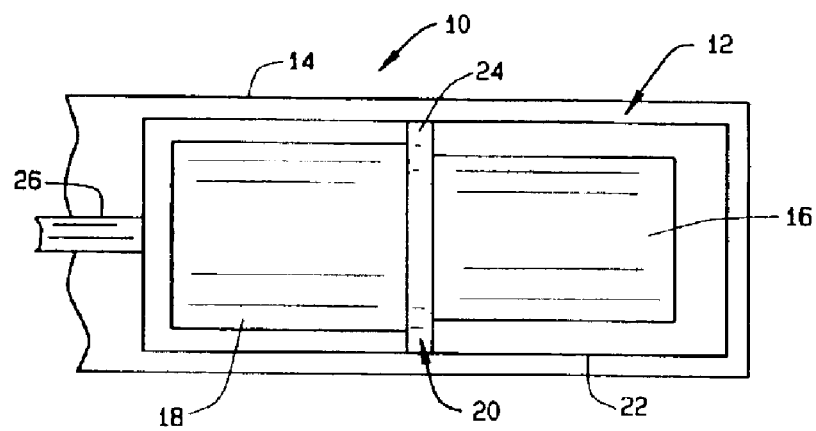
FIG. 1 is schematic representation of a well logging probe having a detector assembly in accordance with an embodiment of the present invention.

Referring now to the drawings, like reference numerals have been used to refer to like parts in FIGS. 1–5. FIG. 1 is a schematic representation of a well logging probe 10 having a detector assembly 12 coupled to a probe housing 14. In an exemplary embodiment, detector assembly 12 includes a scintillator 16 and a photo-multiplier tube 18 optically coupled together by an optical interface 20. Scintillator 16, photo-multiplier tube 18 and optical interface 20 are hermetically sealed inside a detector housing 22. Optical interface 20 includes a window 24 hermetically sealed into detector housing 22. In this exemplary embodiment, window 24 is gadolinium doped filter glass. A detector cable 26 connects detector assembly 12 to data processing equipment (not shown) and a power source (not shown).

Figure 2:
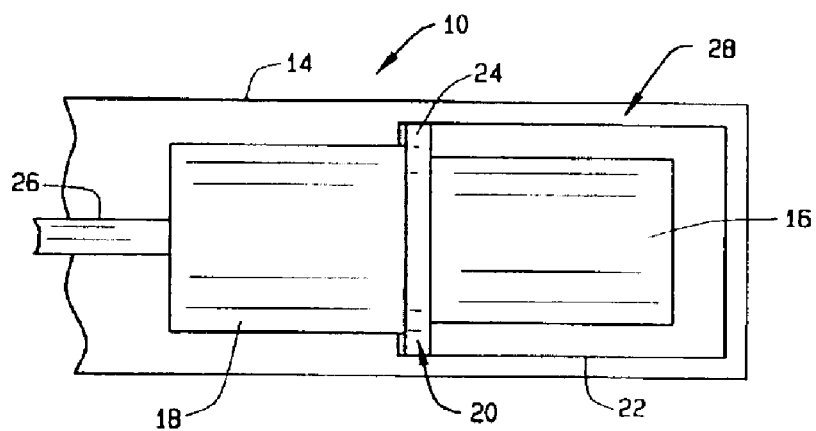
FIG. 2 is schematic representation of a well logging probe having a detector assembly in accordance with another embodiment of the present invention.

FIG. 2 is a schematic representation of a well logging probe 10 having a detector assembly 12 coupled to a probe housing 14. In an exemplary embodiment, detector assembly 28 includes scintillator 16 and photo-multiplier tube 18 optically coupled together by optical interface 20. Scintillator 16 and optical interface 20 are hermetically sealed inside a detector housing 22. Optical interface 20 includes a window 24 hermetically sealed into detector housing 22. In this exemplary embodiment, window 24 is gadolinium doped filter glass. A detector cable 26 connects detector assembly 12 to data processing equipment (not shown) and a power source (not shown).

Figure 3:
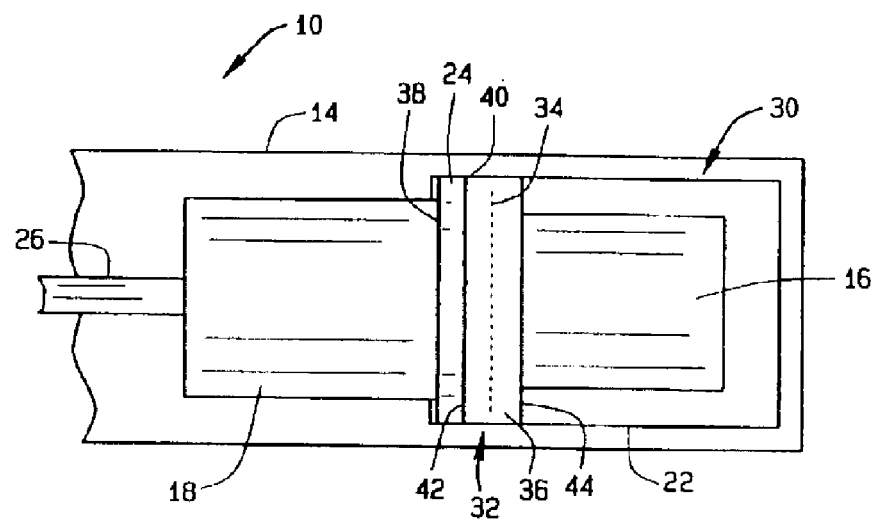
FIG. 3 is schematic representation of a well logging probe having a detector assembly in accordance with another embodiment of the present invention.

FIG. 3 is schematic representation of well logging probe 10 having a detector assembly 30 coupled to probe housing 14. In an exemplary embodiment, detector assembly 30 includes scintillator 16 and photo-multiplier tube 18 optically coupled together by an optical interface 32. Scintillator 16 and optical interface 32 are hermetically sealed inside detector housing 22. Optical interface 32 includes window 24 hermetically sealed into detector housing 22 and a gadolinium doped filter glass 34 embedded inside an elastomeric pad 36. Window 24 can be fabricated from any suitable material, for example sapphire. A first side 38 of window 24 is optically coupled to photo-multiplier 18 and a second side 40 of window 24 is optically coupled to a first side 42 of elastomeric pad 36. A second side 44 of elastomeric pad 36 is optically coupled to scintillator 16. Any known method of optically coupling the components together can be used. In the exemplary embodiment oil is used to optically couple components together. Oil permits good optical contact between components. Detector cable 26 connects detector assembly 30 to data processing equipment (not shown) and a power source (not shown).

Figure 4:
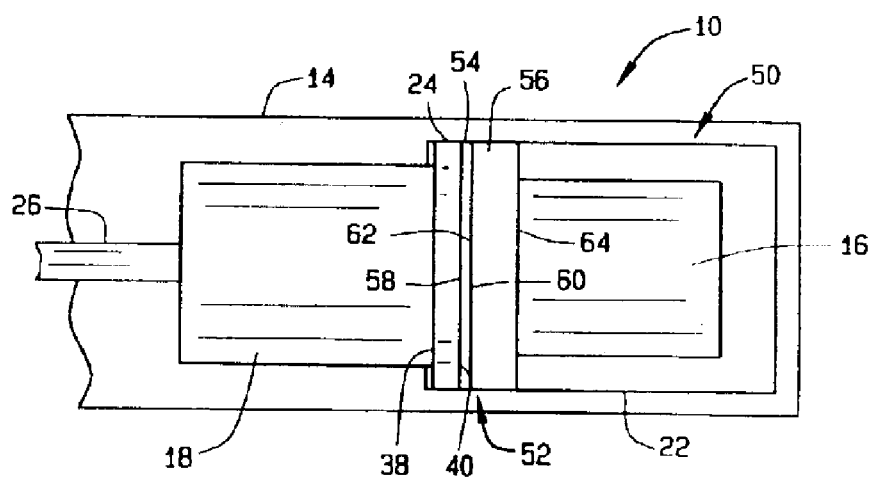
FIG. 4 is schematic representation of a well logging probe having a detector assembly in accordance with another embodiment of the present invention.

FIG. 4 is schematic representation of well logging probe 10 having a detector assembly 50 coupled to probe housing 14. In an exemplary embodiment, detector assembly 50 includes scintillator 16 and photo-multiplier tube 18 optically coupled together by an optical interface 52. Scintillator 16 and optical interface 52 are hermetically sealed inside detector housing 22. Optical interface 52 includes window 24 hermetically sealed into detector housing 22, a gadolinium doped filter glass 54 optically coupled to window 24, and an elastomeric pad 56 optically coupled to gadolinium doped filter glass 54. First side 38 of window 24 is optically coupled to photo-multiplier 18 and second side 40 of window 24 is optically coupled to a first side 58 of gadolinium doped filter glass 54. A second side 60 of gadolinium doped filter glass is coupled to a first side 62 of elastomeric pad 56. A second side 64 of elastomeric pad 56 is optically coupled to scintillator 16. Any known method of optically coupling the components together can be used. In the exemplary embodiment oil is used to optically couple components together. Oil permits good optical contact between components. Detector cable 26 connects detector assembly 50 to data processing equipment (not shown) and a power source (not shown).

Figure 5:
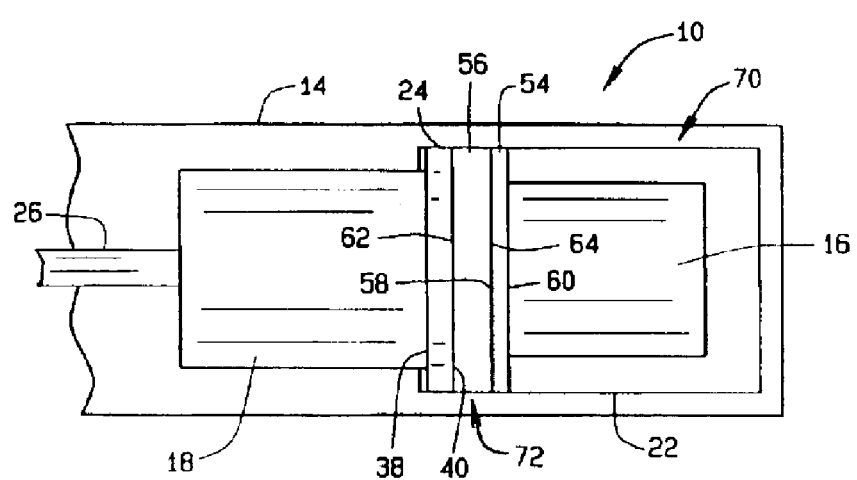
FIG. 5 is schematic representation of a well logging probe having a detector assembly in accordance with another embodiment of the present invention.

FIG. 5 is schematic representation of well logging probe 10 having a detector assembly 70 coupled to probe housing 14. In an exemplary embodiment, detector assembly 70 includes scintillator 16 and photo-multiplier tube 18 optically coupled together by an optical interface 72. Scintillator 16 and optical interface 72 are hermetically sealed inside detector housing 22. Optical interface 72 includes window 24 hermetically sealed into detector housing 22, elastomeric pad 56 optically coupled to window 24, and gadolinium doped filter glass 54 optically coupled to elastomeric pad 56. First side 38 of window 24 is optically coupled to photo-multiplier 18 and second side 40 of window 24 is optically coupled to first side 62 of elastomeric pad 56. Second side 64 of elastomeric pad 56 is optically coupled to first side 58 of gadolinium doped filter glass 54. Second side 60 of gadolinium doped filter glass is coupled to scintillator 16. Any known method of optically coupling the components together can be used. In the exemplary embodiment oil is used to optically couple components together. Oil permits good optical contact between components. Detector cable 26 connects detector assembly 70 to data processing equipment (not shown) and a power source (not shown).

Exemplary embodiments of the detector assembly for a well logging probe are described above in detail. The configurations are not limited to the specific embodiments described herein, but rather, components of the configuration may be utilized independently and separately from other components described herein. Each detector assembly component can also be used in combination with other detector assembly components.

While the invention has been described in terms of various specific embodiments, those skilled in the art will recognize that the invention can be practiced with modification within the spirit and scope of the claims.

What is claimed is:

1. A well logging apparatus comprising a probe having a detector assembly, said detector assembly comprising:
    a scintillator comprising a scintillation crystal capable of producing light when exposed to gamma rays;
    a photo-multiplier; and
    an optical interface including a gadolinium doped filter glass and positioned between said scintillator and said photo-multiplier, said optical interface optically coupling said scintillator and said photo-multiplier.

2. An apparatus in accordance with claim 1 wherein said scintillation crystal comprises a NaI scintillation crystal.

3. An apparatus in accordance with claim 1 wherein said optical interface further comprises a window hermetically sealed into said detector assembly, said window comprising gadolinium doped filter glass.

4. An apparatus in accordance with claim 1 wherein said optical interface further comprises:
    an elastomeric pad; and
    a window hermetically sealed into said detector assembly, said elastomeric pad, said window and said gadolinium doped filter glass optically coupled to each other.

5. An apparatus in accordance with claim 4 wherein a first side of said window is optically coupled to said photo-multiplier, a second side of said window is optically coupled to a first side of said gadolinium doped filter glass, a second side of said gadolinium doped filter glass is optically coupled to a first side of said elastomeric pad, and a second side of said elastomeric pad is optically coupled to said scintillator.

6. An apparatus in accordance with claim 4 wherein a first side of said window is optically coupled to said photo-multiplier, a second side of said window is optically coupled to a first side of said elastomeric pad, a second side of said elastomeric pad is optically coupled to a first side of said gadolinium doped filter glass, and a second side of said gadolinium doped filter glass is optically coupled to said scintillator.

7. An apparatus in accordance with claim 4 wherein said gadolinium doped filter glass is embedded into said elastomeric pad, and a first side of said window is optically coupled to said photo-multiplier, a second side of said window is optically coupled to a first side of said elastomeric pad, and a second side of said elastomeric pad is optically coupled to said scintillator.

8. An apparatus in accordance with claim 4 wherein said window comprises sapphire.

9. A detector assembly for a well logging tool, said detector assembly comprising:

a scintillator comprising a scintillation crystal capable of producing light when exposed to gamma rays;

a photo-multiplier; and an optical interface including a gadolinium doped filter glass and positioned between said scintillator and said photo-multiplier, said optical interface optically coupling said scintillator and said photo-multiplier.

10. A detector assembly in accordance with claim 9 wherein said scintillation crystal comprises a NaI scintillation crystal.

11. A detector assembly in accordance with claim 9 wherein said optical interface further comprises a window hermetically sealed into said detector assembly, said window comprising gadolinium doped filter glass.

12. A detector assembly in accordance with claim 9 wherein said optical interface further comprises:

an elastomeric pad; and a window hermetically sealed into said detector assembly, said elastomeric pad, said window and said gadolinium doped filter glass optically coupled to each other.

13. A detector assembly in accordance with claim 12 wherein a first side of said window is optically coupled to said photo-multiplier, a second side of said window is optically coupled to a first side of said gadolinium doped filter glass, a second side of said gadolinium doped filter glass is optically coupled to a first side of said elastomeric pad, and a second side of said elastomeric pad is optically coupled to said scintillator.

14. A detector assembly in accordance with claim 12 wherein a first side of said window is optically coupled to said photo-multiplier, a second side of said window is optically coupled to a first side of said elastomeric pad, a second side of said elastomeric pad is optically coupled to a first side of said gadolinium doped filter glass, and a second side of said gadolinium doped filter glass is optically coupled to said scintillator.

15. A detector assembly in accordance with claim 12 wherein said gadolinium doped filter glass is embedded into said elastomeric pad, and a first side of said window is optically coupled to said photo-multiplier, a second side of said window is optically coupled to a first side of said elastomeric pad, and a second side of said elastomeric pad is optically coupled to said scintillator.

16. A detector assembly in accordance with claim 12 wherein said window comprises sapphire.

17. A well logging apparatus comprising:

a probe housing; and a detector assembly positioned in said housing, said detector assembly comprising:

a scintillator comprising a scintillation crystal capable of producing light when exposed to gamma rays;

a photo-multiplier; and an optical interface including a gadolinium doped filter glass and positioned between said scintillator and said photo-multiplier, said optical interface optically coupling said scintillator and said photo-multiplier.

18. An apparatus in accordance with claim 17 wherein said scintillation crystal comprises a NaI scintillation crystal.

19. An apparatus in accordance with claim 17 wherein said optical interface further comprises a window hermetically sealed into said detector assembly, said window comprising gadolinium doped filter glass.

20. An apparatus in accordance with claim 17 wherein said optical interface further comprises:

an elastomeric pad; and a window hermetically sealed into said detector assembly, said elastomeric pad, said window and said gadolinium doped filter glass optically coupled to each other.

21. An apparatus in accordance with claim 20 wherein a first side of said window is optically coupled to said photo-multiplier, a second side of said window is optically coupled to a first side of said gadolinium doped filter glass, a second side of said gadolinium doped filter glass is optically coupled to a first side of said elastomeric pad, and a second side of said elastomeric pad is optically coupled to said scintillator.

22. An apparatus in accordance with claim 20 wherein a first side of said window is optically coupled to said photo-multiplier, a second side of said window is optically coupled to a first side of said elastomeric pad, a second side of said elastomeric pad is optically coupled to a first side of said gadolinium doped filter glass, and a second side of said gadolinium doped filter glass is optically coupled to said scintillator.

23. An apparatus in accordance with claim 20 wherein said gadolinium doped filter glass is embedded into said elastomeric pad, and a first side of said window is optically coupled to said photo-multiplier, a second side of said window is optically coupled to a first side of said elastomeric pad, and a second side of said elastomeric pad is optically coupled to said scintillator.

* * * * *